(12) United States Patent
Karashima

(10) Patent No.: US 9,090,218 B2
(45) Date of Patent: Jul. 28, 2015

(54) BATTERY SYSTEM COMPONENT LAYOUT STRUCTURE FOR ELECTRICALLY DRIVEN VEHICLE

(71) Applicant: Nissan Motor Co., Ltd., Yokohama-shi, Kanagawa (JP)

(72) Inventor: Ryusuke Karashima, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/370,275

(22) PCT Filed: Jan. 16, 2013

(86) PCT No.: PCT/JP2013/050597
§ 371 (c)(1),
(2) Date: Jul. 2, 2014

(87) PCT Pub. No.: WO2013/108762
PCT Pub. Date: Jul. 25, 2013

(65) Prior Publication Data
US 2014/0374181 A1     Dec. 25, 2014

(30) Foreign Application Priority Data

Jan. 17, 2012  (JP) .................................. 2012-006668

(51) Int. Cl.
| | | |
|---|---|---|
| *B60R 16/04* | (2006.01) | |
| *B60K 1/04* | (2006.01) | |
| *B60L 11/18* | (2006.01) | |
| *H01M 10/60* | (2014.01) | |
| *B60L 11/14* | (2006.01) | |
| *B60L 3/00* | (2006.01) | |
| *B60R 16/02* | (2006.01) | |
| *B60K 5/04* | (2006.01) | |
| *B60K 11/06* | (2006.01) | |
| *B60K 1/00* | (2006.01) | |

(52) U.S. Cl.
CPC . *B60R 16/04* (2013.01); *B60K 1/04* (2013.01); *B60K 5/04* (2013.01); *B60K 11/06* (2013.01); *B60K 2001/003* (2013.01); *B60K 2001/005* (2013.01); *B60K 2001/0416* (2013.01); *B60L 3/00* (2013.01); *B60L 11/14* (2013.01); *B60L 11/18* (2013.01); *B60R 16/02* (2013.01); *H01M 10/50* (2013.01)

(58) Field of Classification Search
None
See application file for complete search history.

(56) References Cited

U.S. PATENT DOCUMENTS

2011/0168462 A1*  7/2011  Stanek et al. ................. 180/65.1

FOREIGN PATENT DOCUMENTS

| JP | 2004-106807 A | 4/2004 |
|---|---|---|
| JP | 2010-12868 A | 1/2010 |
| JP | 2011-15544 A | 1/2011 |
| JP | 2011-130555 A | 6/2011 |
| JP | 2011-235761 A | 11/2011 |

* cited by examiner

*Primary Examiner* — J. Allen Shriver, II
*Assistant Examiner* — Hilary L Johns
(74) *Attorney, Agent, or Firm* — Global IP Counselors, LLP

(57) ABSTRACT

A vehicle battery system component layout structure is basically provided with a center room, a rear room, a vehicle propulsion battery and an auxiliary battery. The center room of a vehicle is configured to seat a driver and a passenger. The rear room of the vehicle is disposed rearward of the center room. The vehicle propulsion battery is disposed in a vehicle front side space in the rear room. The auxiliary battery is disposed in a vehicle rear side space in the rear room rearward of the propulsion battery and in a position in which the auxiliary battery overlaps with the propulsion battery in a vehicle longitudinal direction as viewed from a rear end of the vehicle.

8 Claims, 4 Drawing Sheets

BATTERY SYSTEM COMPONENT LAYOUT STRUCTURE FOR ELECTRICALLY DRIVEN VEHICLE

CROSS-REFERENCE TO RELATED APPLICATIONS

This application is a U.S. National stage of International Application No. PCT/JP2013/050597, filed Jan. 16, 2013. This application claims priority to Japanese Patent Application No. 2012-006668, filed on Jan. 17, 2012. The entire disclosure of Japanese Patent Application No. 2012-006668 is hereby incorporated herein by reference.

BACKGROUND

Technical Field

1. Field of the Invention

The present invention relates to a battery system element or component layout structure for an electrically driven vehicle in which a battery for vehicle propulsion (propulsion battery) and a battery for auxiliary equipment or components (auxiliary battery) are arranged in a rear room of the rear part of the vehicle.

2. Background Information

Conventionally, in a battery system component layout structure of the electrically driven vehicle, it is known that the propulsion battery is disposed in a rear room of the rear part of the vehicle and the auxiliary battery is disposed on the upper surface of the propulsion battery (for example, see Japanese Patent Application Publication No. 2010-12868).

SUMMARY

However, in the conventional battery system component layout structure of the electrically driven vehicle, since a vertical stacking layout structure is adopted in which the auxiliary is arranged on the upper surface of the propulsion battery. Therefore, at the time of rear collision when the vehicle is hit from the rear of the vehicle, there is a problem that an impact force would be simultaneously input to the propulsion battery and the auxiliary battery so that the propulsion battery cannot be protected from the rear collision impact.

The present invention has been made in view of the above problem and an object thereof is to provide a battery system component layout structure for an electrically driven vehicle by using the auxiliary battery, which is arranged in the rear room along with the propulsion battery, as a buffer member so as to protect the propulsion battery from a rear end collision impact.

In order to achieve the above object, according to the present invention, the propulsion battery and the auxiliary battery are disposed in a rear room at the rear part of the vehicle. In the battery system component layout structure for an electrically driven vehicle, the propulsion battery is disposed in the vehicle front side space in the rear room. Further, the auxiliary battery is disposed in a vehicle rear side space rearward of the propulsion battery and in a position in which the auxiliary battery overlaps with the propulsion battery in the vehicle longitudinal direction.

Accordingly, at the time of rear collision, the auxiliary battery, which is disposed in a vehicle rear side space rearward of the propulsion battery and in an position in which the auxiliary battery overlaps with the propulsion battery with respect to the vehicle longitudinal direction, receives the impact force due to a rear end collision first and thus serves as a buffer member for absorbing an impact energy and protects the propulsion battery. Thus, by using the auxiliary battery, which is arranged together with the propulsion or driving battery in the rear room, as a buffer member, it is possible to protect the propulsion battery from the rear collision impact.

BRIEF DESCRIPTION OF THE DRAWINGS

Referring now to the attached drawings which form a part of this original disclosure.

DETAILED DESCRIPTION OF THE EMBODIMENTS

Figure 1:
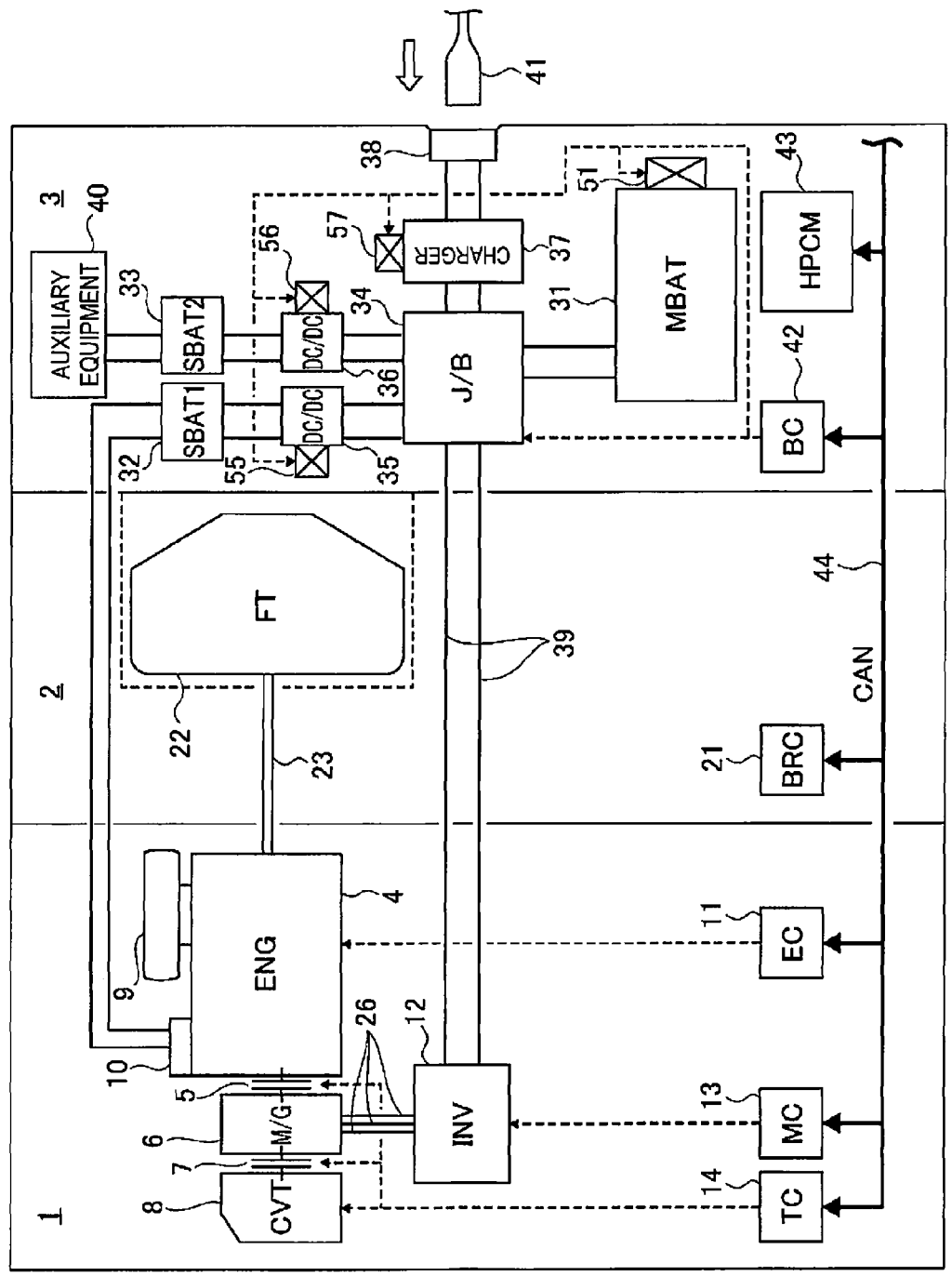
FIG. 1 is an overall system block diagram showing an FF plug-in hybrid vehicle to which a battery cooling structure of the first embodiment is applied.

The best mode for implementing a battery cooling structure will be described below with reference to a first embodiment shown in the drawings.

First Embodiment

First, a configuration is described. The configuration of the battery cooling structure for the FF plug-in hybrid vehicle (as an example of the electrically driven vehicles) will be described in an "overall system configuration", a "layout structure of the battery system components", and a "cooling structure of the battery system components", separately.

Overall System Configuration

FIG. 1 is an overall system diagram illustrating an FF plug-in hybrid vehicle to which a battery cooling structure of the first embodiment is applied. Below, with reference to FIG. 1, description is given of the overall system configuration of the plug-in hybrid vehicle.

As shown in FIG. 1, the FF plug-in hybrid vehicle is divided into three spaces, i.e., a front room or compartment 1 on the vehicle front side for mounting power train system components, a center room or compartment 2 where a driver and an occupant are seated, and a rear room or compartment 3 at the vehicle rear side for mounting battery system components. Here, the "power train system components" refer to the components constituting a power train system including an electronic control system. The "battery system components" refer to the components constituting the battery system including an electronic control system. In addition, the rear room or compartment 3 may be a luggage room capable of accommodating luggage.

In the front room 1, as shown in FIG. 1, a laterally disposed engine 4, a first clutch 5, a motor/generator 6, a second clutch 7, a belt type continuously variable transmission 8 are arranged as power train system components. Note that the laterally disposed engine 4 has an air cleaner 9 and a starter motor 10. Further, the output shaft of the belt type continuously variable transmission 8 is drivingly connected to left and right front wheels via a final reduction unit, a differential gear and left and right drive shafts (not shown).

The laterally displaced engine 4 is an engine which is arranged in the front room 1 with the crankshaft direction aligned with the width direction of the vehicle. In the front room 1 in which the lateral engine 4 is placed, an engine controller 11 is arranged as a constituting element of the engine control system for performing various controls related to the lateral engine 4.

The first clutch 5 is formed by a hydraulic single plate friction clutch or a multi-plate friction clutch interposed between the lateral engine 4 and the motor/generator 6 for a selective control among an engagement, slip-engagement, and released states in response to a first clutch hydraulic pressure.

The motor/generator 6 is a permanent magnet synchronous motor of three-phase alternating current which is connected to the lateral engine 4 through the first clutch 5. The motor/generator 6 is connected to an inverter 12 via a three-phase alternating harness to be operative to convert a direct current into a three-phase alternating current in a driving mode while converting a three-phase alternating current to a direct current in a regenerative mode. In the front room 1 where the motor/generator is arranged, a motor controller 13 is arranged as a constituting component for motor control system for outputting a control command to the inverter 12.

The second clutch 7 is a hydraulic single plate friction clutch or a multi-plate friction clutch interposed between the motor/generator 6 and the left and right driving, front wheels for a selective control among an engagement, slip-engagement, and release states in response to a second clutch hydraulic pressure.

The belt type continuously variable transmission 8 is subject to a shift control to a continuous speed ratio by changing the diameters of the belt winding due to a shift hydraulic pressure to a primary oil chamber and a secondary oil chamber. The belt type continuously variable transmission 8 regulates a line pressure from the pump discharge pressure and has a control valve unit that produces the first and second clutch hydraulic pressures and the shift hydraulic pressure using the line pressure as a source pressure. In the front room 1 where the first and second clutches 5, 7 and the belt type continuously variable transmission 8 are placed, a transmission controller 14 is arranged as a constituting component of the hydraulic control system for outputting hydraulic commands to each hydraulic actuator of the control valve unit.

As the typical running modes in which the driving modes in the power train system are different from each other, an "EV mode", an "HEV mode" and a "WSC mode" are provided. The "EV mode" is a mode in which the first clutch 5 is released and the second clutch 7 is engaged to achieve a motor driven mode. The "HEV mode" is a mode in which the vehicle travels by engaging the two clutches 5, 7. The "WSC mode" is a mode in which the first clutch 5 is either engaged or released with the second clutch 7 being slip-engaged for vehicle travelling.

In the center room 2, as shown in FIG. 1, the brake controller 21 is disposed on the vehicle front side and in a position in which the brake hydraulic fluid pressure actuator is located for cooperative control for generating a regenerative braking force and a hydraulic pressure braking force. Further, at the vehicle rear side position and at a position lower than a floor panel partitioning the center room 2, a fuel tank 2 is disposed for storing a fuel for the lateral engine 4. The lateral engine 4 and the fuel tank 22 are connected through a fuel pipe 23.

In the rear room 3, as shown in FIG. 1, a propulsion battery 31, a first auxiliary battery 32, a second auxiliary battery 33, a joint box 34, and a first DC/DC converter 35, a second DC/DC converter 36 are disposed, respectively, as the battery system components. In the rear room 3, due to a plug-in hybrid vehicle, a charger 37 and a charge port 38 are disposed as additional battery system components.

The propulsion battery 31 represents a rechargeable battery as a driving or propulsion power source. For example, a laminated lithium-ion battery is used. The propulsion battery 31 is structured by stacking a plurality of cells that are connected to each other to form a battery module, and placing a plurality of the battery modules in a pack case while providing gap passages within the pack case. When the motor/generator 6 performs a driving control, the propulsion battery 31 discharges though the joint box 34, the power line harness 39, and the inverter 12. On the other hand, when the motor/generator 6 operates in a regenerative control, the motor/generator 6 charges through the inverter 12, the power line harness 39, and the joint box 34.

The first auxiliary battery 32 is a low-voltage battery that is mounted as a dedicated power supply of the starter motor 10 among the auxiliary vehicle-mounted equipment. The second auxiliary battery 33 is a low voltage battery which is mounted as a power source for the auxiliary equipment or components 40 other than the starter motor 10. The reason for the provision of two batteries 32, 33 is to ensure an engine start in response to an engine start request by the starter motor 10. For example, if only one auxiliary battery would be equipped, a voltage drop may occur due to the simultaneous use of the starter motor 10 and the other accessory 40, for example.

The joint box 34 is a distribution board which aggregates relay circuits for supplying/cutoff/distribution of the high-voltage to the propulsion battery 31. For example, when the vehicle is stopped at a charging station, etc. and a connector plug 41 is connected to a charging port 38 (i.e. subject to "plug-in"), the propulsion battery 31 will be charged through a charging port 38, a charger 37, and the joint box 34. Further, when the charging amount of the first auxiliary battery 32 is insufficient, part of the charging amount for the propulsion battery 31 is used for securing the charging amount of the first auxiliary battery 32 through the joint box 34, the first DC/DC converter 35. Similarly, when the charging amount of the second auxiliary battery 33 is insufficient, part of the charging amount of the propulsion battery 31 is used for securing the charging amount of the second auxiliary battery 33 through the joint box 34 and the second DC/DC converter 36.

The propulsion battery 31, the first DC/DC converter 35, the second DC/DC converter 36, and the charger 37 are all of pack structure and each houses and covers the whole in a case. Air cooling fan units 51, 55, 56, and 57 are respectively disposed to the case associated. In the rear room 3 in which the joint box 34 and the cooling fan units 51, 55, 56, and 57 are disposed, a battery controller 42 is arranged as a constituting component of the battery control system for performing a capacity and temperature control of the propulsion battery 31 and an operational control of the cooling fan units 51, 55, 56, and 57.

In the rear room 3, an integrated controller 43 is arranged as a component of the integrated control system having a function for managing the energy consumption of the whole vehicle to allow the vehicle to run at maximum efficiency. Note that the integrated controller 43 and each of the controllers 11, 13,14,21,42 exchange information via a CAN communication line 44.

Arrangement of the Battery System Component

Figure 2:
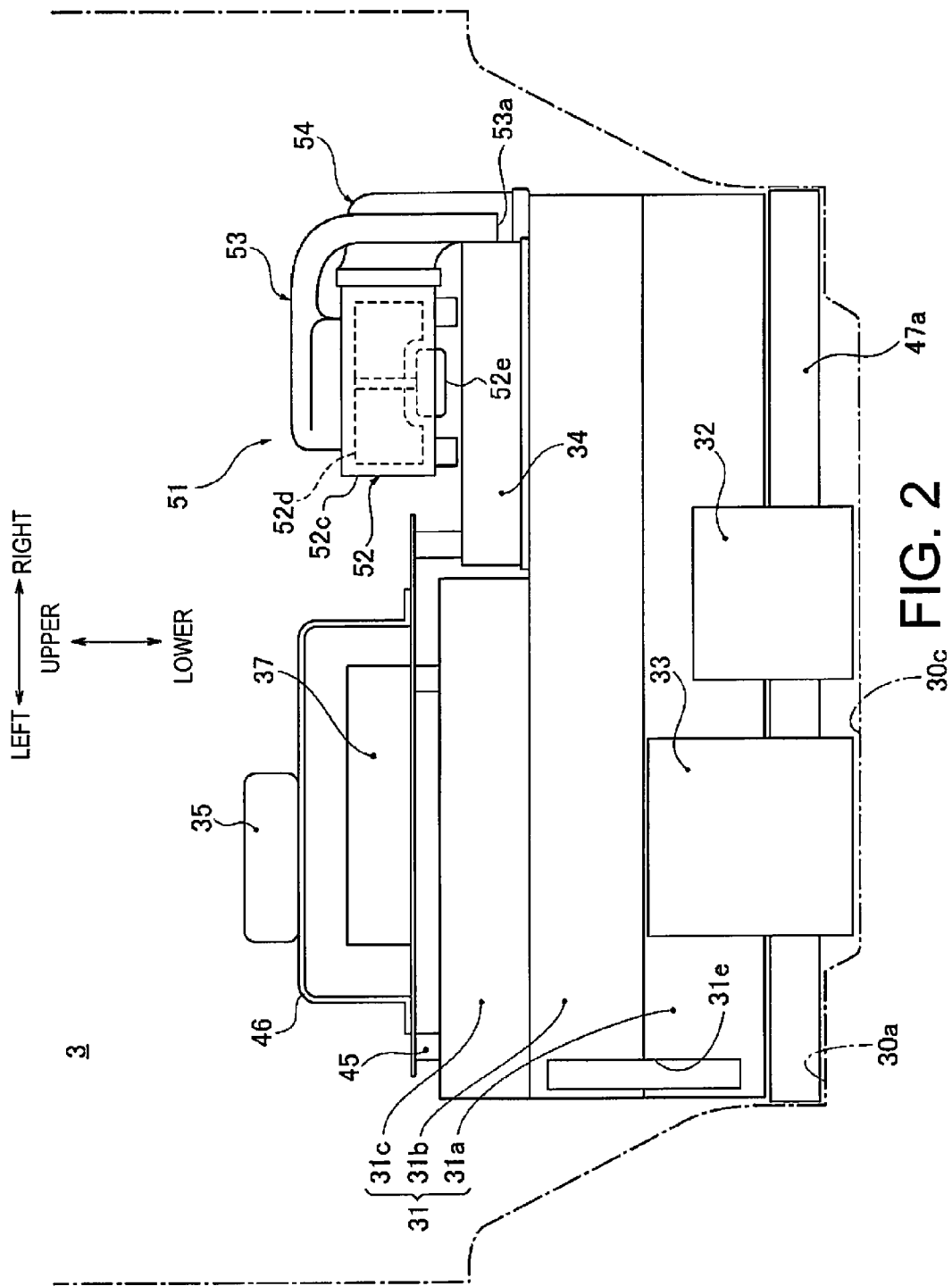
FIG. 2 is a rear view showing a battery system component layout structure in a rear room in the FF plug-in hybrid vehicle of the first embodiment.
Figure 3:
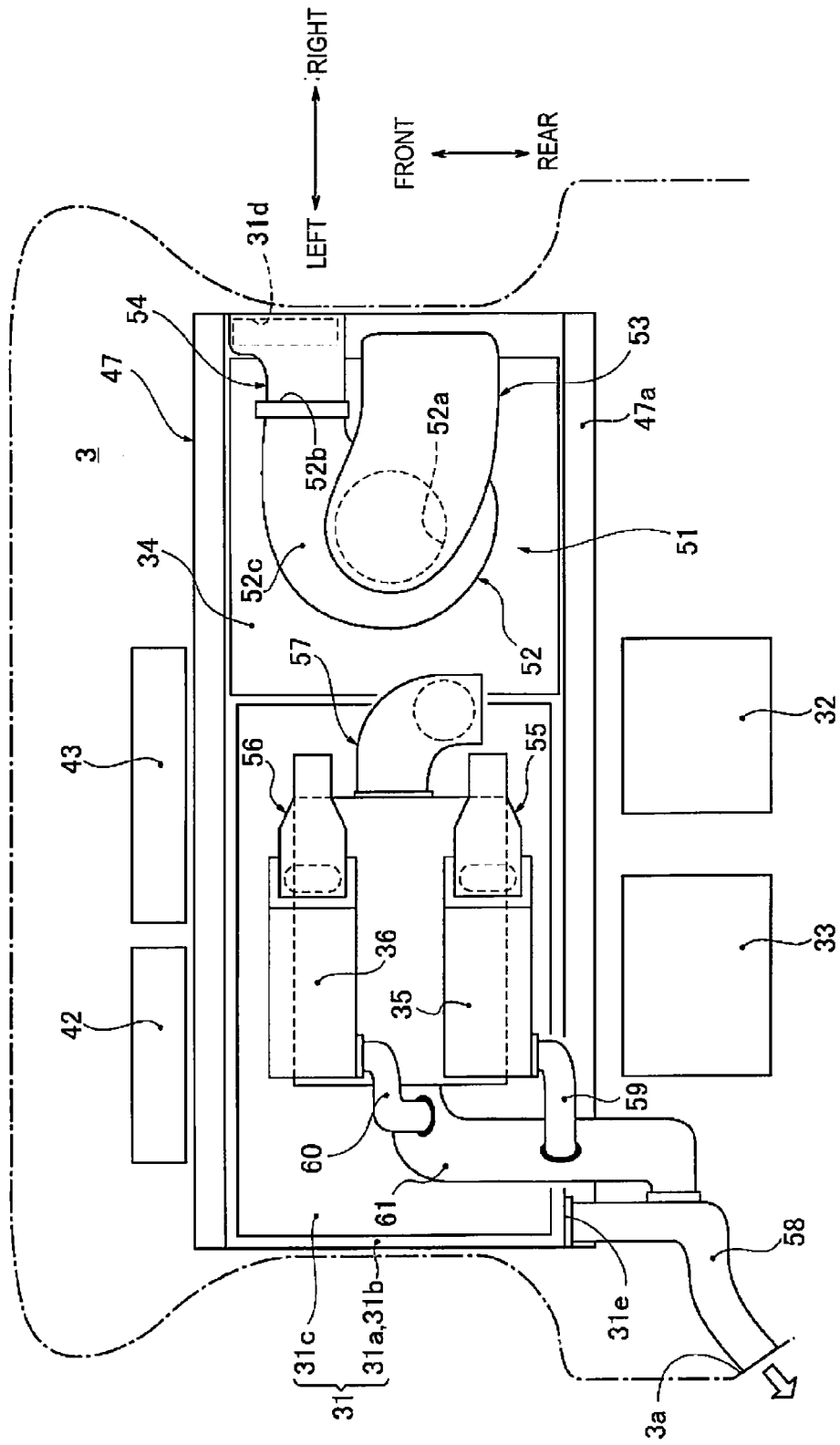
FIG. 3 is a plan view showing a battery system component layout structure in the rear room in the FF plug-in hybrid vehicle of the first embodiment.
Figure 4:
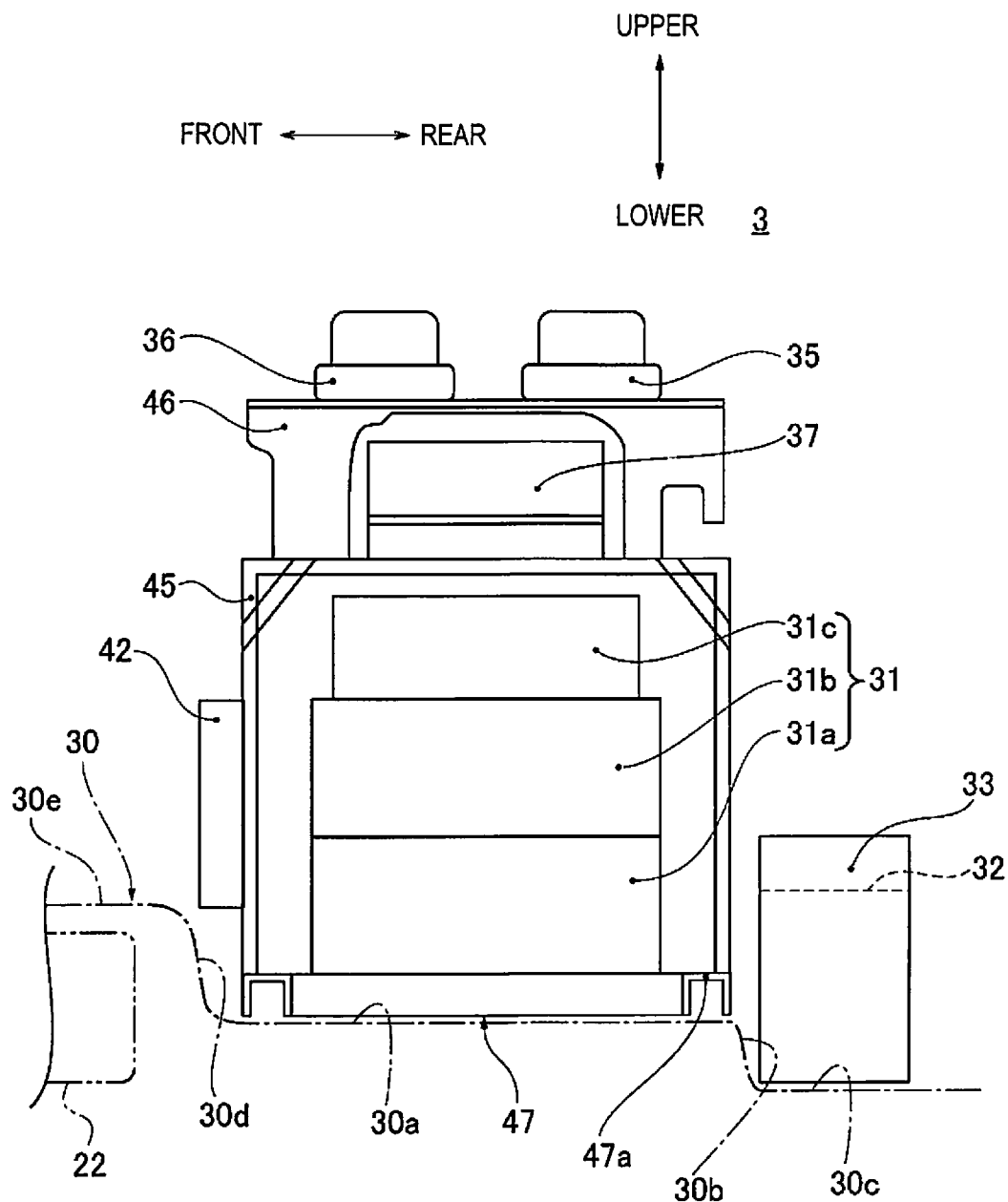
FIG. 4 is a side view showing a battery system component layout

FIGS. 2 to 4 illustrate respectively a rear view, a plan view, and a side view showing a battery system component layout structure in the rear room. Below with reference to FIGS. 2-4, description will be given of an arrangement structure of the battery system components.

In the rear room 3, as shown in FIGS. 2-4, the propulsion battery 31, the first auxiliary battery 32 (auxiliary battery), the second auxiliary battery 33 (auxiliary battery), the joint box 34 (electrical components), and the first DC/DC converter 35 (electrical components), and the second DC/DC converter 36 (electrical components), the charger 37 (electrical component), the battery controller 42 and the integrated controller 43 are arranged.

As shown in FIGS. 2 to 4, the propulsion battery 31 is arranged in the vehicle front side space in of the rear room 3 to extend from one end of the vehicle width direction to the other end. The propulsion battery 31 is of a three-layer structure composed of a lower stage battery 31a, a middle stage battery 31b stacked in the same shape as the lower stage battery 31a, and an upper stage battery 31c smaller in shape than the middle stage battery 31b and stacked in a position closer to the left side thereof. This arrangement is necessitated for a battery of the FF plug-in hybrid vehicle to meet the demand for high battery capacity in order to ensure a sufficient distance traveled in the electric vehicle mode and to meet the fuel efficiency requirements.

As shown in FIGS. 2 to 4, the first auxiliary battery 32 and the second auxiliary battery 33 are arranged in a position of a vehicle rear side space than the propulsion battery 31 in the rear room 2, and are disposed at a position overlapping with propulsion battery 31 in the vehicle longitudinal direction. As shown in FIG. 4, the room floor surface 30 representing the floor surface of the rear room 3 is configured by a first floor surface 30a on the vehicle front side and a second floor surface 30c provided with a stepped wall surface 30b interposed to the first floor surface 30a at a ground or road clearance lower than the first floor surface 30a. In addition, the propulsion battery 31 is mounted on the first floor surface 30a while both auxiliary batteries 32, 33 are mounted on the second floor surface 30c. As shown in FIG. 3, both auxiliary batteries 32, 33 are disposed side by side in the vehicle width direction or lateral direction at the same vehicle longitudinal direction. Note that the room floor surface 30 has a third floor surface 30e with a higher ground clearance than the first floor surface 30a with a stepped wall surface 30d at the vehicle front side of the first floor surface 30a. This stepped wall surface 30d and the third floor surface 30e are intended for securing an arrangement space for a fuel tank 22.

As shown in FIGS. 2 and 3, the joint box 34 is arranged in a lateral position of the upper stage battery 31c that is smaller in shape in both the vehicle width direction and longitudinal direction compared to the lower stage battery 31a and the middle stage battery 31b and on the upper surface position of the middle stage battery 31.

The first DC/DC converter 35, the second 2DC/DC converter 36, and the charger 37 are electrical components that manage the charging and discharging operations of the propulsion battery 31 and both the auxiliary batteries 32 and 33 and are disposed in a stacked state in a vehicle upper space of the upper stage battery 31c. The battery charger 37 is mounted on a first frame 45 that is arranged to enclose the propulsion battery 31 including the upper battery 31c. Both the DC/DC converters 35, 36 are fixed to the first frame 45 and are arranged on a second frame 46 arranged to surround the charger 37 side by side in the vehicle longitudinal direction. Note that the first frame 45 is disposed on a base frame 47 assembled in a square shape. Further, the vehicle width direction frame portion 47a at the vehicle rearward position of the base frame 47 is disposed along the upper surface of the stepped wall surface 30b and at an intermediate position between the propulsion battery 31 and both auxiliary batteries 32, 33 in the vehicle longitudinal direction.

As shown in FIGS. 3 and 4, the battery controller 42 and the integrated controller 43 are accommodated in two controller boxes fixed to a vehicle front side frame portion among the first frame 45 that is arranged to surround the propulsion battery 31.

Cooling Structure of the Battery System Components

As shown in FIGS. 2 and 3, in the rear room 3, a cooling structure of the battery system components are provided, which includes a cooling fan unit for battery 51, cooling fan unit for converters 55 and 56, a cooling fan unit for a charger 57, an exhaust duct for battery 58, and exhaust ducts for converters 59 and 60.

The cooling fan unit for battery 51 is a unit intended to cool the propulsion battery placed in the rear room 3 by a cooling air, and is composed of a cooling fan 52, a suction duct 53, and a discharge duct 54.

As shown in FIGS. 2 and 3, the cooling fan 52 is arranged in the upper surface space of the propulsion battery 31, shifted to one side in the vehicle width direction and above the joint box 34. This cooling fan 52 is of a centrifugal fan structure, and includes a scroll casing 52c, rotary blades 52d which is disposed in the scroll casing 52c with its rotation axis direction aligned with the vehicle vertical direction, a motor 52e for rotatably driving the rotary blades 52d. Open toward the vehicle above the suction opening 52a, the scroll casing 52b is open toward the vehicle width direction of the discharge port 52b.

The suction duct 53 is connected, as shown in FIGS. 2 and 3, to a suction opening 52a at its one end while the other end is open toward the bottom of the vehicle. At the time of operation of the cooling fan 52, air may introduced into the suction opening 52a of the scroll casing 52b through the suction duct 53 from the duct open end 53a.

The discharge duct 54 is connected, as shown in FIGS. 2 and 3, to a discharge opening 52b of the scroll casing 52b at its one end while the other end is connected to a cooling air suction opening 31d for the propulsion battery 31. The cooling air suction opening 31d is disposed, as shown in FIG. 3, in a vehicle front side position at one end (right end) in the vehicle width direction of the propulsion battery 31. At the time of operation of the cooling fan 52, the cooling air from the cooling fan 52 will be introduced into an inner passage of the propulsion battery 31 toward the vehicle downward direction from the cooling air suction opening 31d.

The cooling fan units for converters 55, 56 are the units intended for cooling by cooling air the first DC/DC converter 35 and the second DC/DC converter 36 disposed in the rear room 3, and are composed of a cooling fan and a fan duct.

As shown in FIG. 3, the cooling fan unit for charger 57 is the unit that cools by cooling air the charger 37 disposed in the rear room 3, and is composed of a cooling fan and a fan duct.

The exhaust duct 58 for battery is connected, at its one end, to a cooling air discharge opening 31a for the propulsion battery and, at the other end, connected to a drafter opening 3a formed in a vehicle body panel. As shown in FIG. 2, the cooling air discharge opening 31e is set at a position on the vehicle rear side and in the other end portion (left end portion) in the vehicle width direction of the propulsion battery 31. At the time of operation of the cooling fan 52, the cooling air which has passed through the internal passage of the propulsion battery 31 with its temperature raised, will be discharged from the cooling air discharge opening 31e opening toward the rear of the vehicle to the drafter opening 3a.

The exhaust ducts for converter 59, 60 are respectively connected, at one end, to a cooling air discharge opening of the associated first DC/DC converter 35 or second 1DC/DC converter 36, and, connected at the other end to the exhaust duct 61 for charger 61.

The exhaust duct for charger 61 has one end connected to the cooling air outlet of the charger 37 and the other end connected to the exhaust duct for the battery 58. That is, as shown in FIG. 3, four exhaust ducts 58, 59, 60, 61 shares a discharge path and all final discharge ports are configured to be a drafter opening 3a so that the warmed cooling air will be discharged to the atmosphere through a clearance space formed between an inner panel and an outer panel, both of which constitute a vehicle body.

Now, description is given of the operation.

The operation in the battery cooling structure of the FF plug-in hybrid vehicle in the first embodiment will be of described separately in an "layout operation of the propulsion battery and the auxiliary battery", and the "cooling effect of the battery system components".

Layout Operation of the Propulsion Battery and the Auxiliary Battery

In the case in which the propulsion battery 31 and the auxiliary battery 32, 33 are arranged in the rear room 3, it is necessary to provide a protective measure against a rear-end collision on the high-voltage propulsion battery 31. Below, the layout operations reflecting this with respect to the propulsion battery 31 and the auxiliary battery 32, 33 are described.

In the first embodiment, such a layout design is adopted in which the propulsion battery 31 is arranged in the vehicle front side space of the rear room 3, while the auxiliary battery 32, 33 is arranged in a vehicle space rearward of the propulsion battery 31 and in a position so as to overlap in the vehicle longitudinal direction with the propulsion battery 31. With this design or configuration, at the time of rear-end collision, upon the vehicle body being deformed by an impact force to push in the vehicle forward direction, the auxiliary battery 32, 33 receives and absorbs the impact force due to the rear-end collision earlier than the propulsion battery 31. In other words, the auxiliary battery 32, 33 serves as a buffer or cushioning member to protect the propulsion battery 31. Therefore, without providing a separate protective member or buffer member with respect to the rear collision, by making use of the auxiliary battery 32, 33 which is arranged in the rear room 3 together with the propulsion battery 31 as a buffer member, the propulsion battery 31 will be protected from the rear impact.

In the first embodiment, the room floor surface 30 representing a floor surface of the rear room 3 is configured to include a vehicle front side, first floor surface 30a and a second floor surface 30c provided with a lower ground surface clearance than the first floor surface 30a through a stepped wall surface 30b extending from the first floor surface 30a. Further, such a configuration is adopted in which the propulsion battery 31 is mounted on the first floor surface 30a and the auxiliary battery 32, 33 is mounted on the second floor surface 30c. With these configurations, at the time of a rear end collision, even if the auxiliary battery 32, 333 moves toward the front of the vehicle, the movement thereof will be prevented by contact with the stepped wall surface 30b so that only the auxiliary battery 32, 33 sandwiched by the stepped wall surface 30b will be subject to deformation or damage. Note that the movement preventing function to the vehicle front side of the auxiliary battery 32, 33 due to the stepped wall 30b is further reinforced by a vehicle width direction frame portion 47a which is disposed along the stepped wall surface 30b. Therefore, at the time of rear collision, by preventing the auxiliary battery 32, 33 from moving forward of the vehicle toward the propulsion battery 31 by the stepped wall surface 30b, the protection performance with respect to the rear end impact shock may be improved.

In the first embodiment, such a configuration is adopted in which, in the vehicle upper space of the propulsion battery 31, the electrical components (first DC/DC converter 35, second DC/DC converter 36, and charger 37) to manage the charging and the discharging of the propulsion battery 31 and the auxiliary battery 32, 33 are disposed. With this configuration, when placing the electrical equipment to manage the charge/discharge of the propulsion battery 31 and the auxiliary battery 32, 33 in the longitudinal position of the propulsion battery 31, it is necessary for the design of the rear room 3 to secure a space occupied by the electrical components. In contrast, through the three-dimensional arrangement of the electrical components, the vehicle space above the propulsion battery 31 disposed in the rear room 3 is effectively utilized so that compactness of the rear room 3 may be achieved.

In the first embodiment, as the auxiliary battery, a first auxiliary battery 32 that is intended for a power source of a starter motor 1 of the engine 4 and a second auxiliary battery 33 as a power source for auxiliary equipment other than that for starter motor 10 are provided. Further, such a configuration is adopted in which, as shown in FIGS. 2 and 3, the first auxiliary battery 32 and the second auxiliary battery 33 are arranged side by side in the vehicle width direction at the same vehicle longitudinal position in the vehicle rear side space of the propulsion battery 31. With this configuration, the occupied area in the vehicle width direction by the first auxiliary battery 32 and the second auxiliary battery 33 expands. Thus, even if the rear end collision is offset to the left or right, two auxiliary batteries 32, 33 would serve as buffer member to protect the propulsion battery 31. Accordingly, by utilizing the auxiliary battery 32, 33 which are arranged side by side in the vehicle width direction in the rear room 3 as a buffer member, the propulsion battery 31 may be protected even against the offset rear impact.

Cooling Operation of the Battery System Components

Since the battery performance decreases as the temperature rises, the propulsion battery 31 is required to be cooled in order to maintain a high battery performance. Below, description is give of the cooling operation of the battery system components reflects this consideration.

To describe the cooling operation of the propulsion battery 31, when the rotary blades 53d of a cooling fan 52 are driven to rotate by a motor 52e, an air within the rear room 3 is sucked from a suction duct 53 connected to a suction opening 52a of a scroll casing 52c. Then, the cooling wind from the cooling fan is discharged in a cooling wind suction opening 31d of the propulsion battery 31 from the discharge duct 54 connected to the discharge opening 52b of the scroll casing 52c. Thus, the cooling air from the cooling fan 52 will be introduced from the cooling air suction opening 31d toward the vehicle downward direction into the inner passage of the propulsion battery so as to remove the heat from each battery cell when the cooling air passes the internal passage of the traction battery 31 diagonally. Then, by discharging the cooling air with a temperature rise to a drafter opening 3a from the cooling air discharge outlet 31e via an exhaust duct for battery 58 that is connected to the cooling air exhaust opening 31e opening toward vehicle rearward direction of the propulsion battery 31, the propulsion battery 31 is cooled.

With respect to the first DC/DC converter 35 and the second DC/DC converter 36, both of which require cooling due to being placed on the vehicle space above the propulsion battery 31, by actuating the converter cooling fan unit 55, 56, the cooling air will be introduced into the inside of the case so as to take away the heat from the converter circuit. Then, the cooling air with a temperature rise will be discharged in a drafter opening 3a from an exhaust duct for converter 59, 60 connected at one end to the first DC/DC converter 35 and the second DC/DC converter 36 respectively. At this time, the cooling air with a temperature rise is discharged to a drafter opening 3a from the exhaust duct for converter 59, 60 via the exhaust duct for charger 61 and the exhaust duct for battery 58 to cool both DC/DC converters 35, 36.

With respect to the charger 37 which requires cooling due to being placed on the vehicle upper space above the propulsion battery 31, by operating the cooling fan unit for charger 57, the cooling air will be introduced into the inside of the case so as to take away the heat from the charging circuit. By operating the charger cooling fan unit 57, Then, the cooling air with a temperature rise will be discharged in a drafter opening 3a from an exhaust duct for charger 61 connected at one end to the cooling air discharge outlet via the exhaust duct for battery 58 so as to cool the charger 37.

In the first embodiment, the propulsion battery 31 above which a cooling fan 52 is arranged is disposed to extend from one end to the other end in the vehicle width direction in the rear room 3. By adopting this configuration, as shown in FIGS. 2 and 3, the maximum dimensions in the vehicle width direction of the propulsion battery 31 is secured for arranging in the rear room 3. Therefore, if the total volume and the height required for the propulsion battery 31 are determined, the vehicle longitudinal dimension is shortened. Further, in the upper surface of the space vehicle, a cooling fan 52 is disposed shifted to one side in the vehicle width direction. By adopting this configuration, as shown in FIGS. 2 and 3, the other side end top surface space not disposed with the cooling fan 52 may be secured for a free space. Therefore, this free space may be available for placing electrical components such as the DC/DC converter 35 and the like. Consequently, the cooling of the propulsion battery 31 arranged in the rear room 3 is achieved while achieving effective use of the upper space and shorten the dimension of the propulsion battery 31 in the vehicle longitudinal direction.

In the first embodiment, such the cooling fan 52 is configured to be a centrifugal fan which has a scroll casing 52c with its suction opening 52a directed in the vehicle upward direction, rotating blade 52d disposed within the scroll casing 52c with its rotating axis extending in the vehicle vertical direction. When placing the centrifugal fan, generally, the suction opening is arranged to open in the vehicle longitudinal direction or vehicle width direction. However, in these cases, the height of the centrifugal fan (scroll casing) would be higher than the diameter of the rotor blades. In contrast, by using an arrangement in which the suction opening 52a of the scroll casing 52c opens toward the top of the vehicle, the height of the cooling fan 52 (scroll casing 52c) is slightly larger than the wingspan (<diameter) of the rotor blades 52d. Therefore, the size increase in the height direction is suppressed by placing the cooling fan 52 on the vehicle upper surface space of the propulsion battery 31.

In the first embodiment, such a configuration is adopted in which the cooling air suction inlet 31d for introducing the cooling air from the cooling fan 52 to the inner passage of the propulsion battery 31 is disposed at one end of the propulsion battery 31 in the vehicle width direction and in the vehicle front side position. Further, the cooling air discharge opening 31e discharging the cooling air from the cooling fan 52 through the inner passage of the propulsion battery 31 is disposed at the other end of the propulsion battery 31 in the vehicle width direction and in the vehicle rear side position. With these configurations, the flow direction of the cooling air directing toward the cooling air discharge opening 31e from the cooling air suction inlet 31d is in a diagonal direction of the propulsion battery. Thus, the flow direction of the cooling air within the propulsion battery 31 will not be shifted but travels throughout in the entire propulsion battery 31. Accordingly, due to the flow of cooling air in the diagonal direction toward the cooling air opening 31e from the cooling air inlet 31d, the propulsion battery 31 is cooled uniformly.

In the first embodiment, in the upper surface space of the propulsion battery 31, the electrical components (both DC/DC converters 35, 36, charger 37) are disposed in the other end upper surface space opposite in the vehicle width direction from the one end side upper space where the cooling fan 52 is disposed. With this arrangement, the electrical components that manage to charge or discharge the propulsion battery 31 and the like is disposed in the upper surface space of the propulsion battery 31 along with the cooling fan 52. Thus, the upper surface space of the propulsion battery 31 disposed in the rear room 3 is effectively utilized, and a compact rear room 3 is achieved.

Now, description is given of the effect. According to the battery cooling structure of the FF plug-in hybrid vehicle in the first embodiment, it is possible to obtain the following effects.

(1) In the battery system component layout structure for an electrically driven vehicle (FF plug-in hybrid vehicle) with a vehicle propulsion battery 31 and an auxiliary battery 32 disposed in a rear room 3 at the rear part of the vehicle, the propulsion battery 31 is disposed in the vehicle front side space in the rear room 3, and the auxiliary battery 32, 33 is disposed in a vehicle rear side space rearward of the propulsion battery 31 and in a position in which the propulsion battery overlaps with the propulsion battery 31 in the vehicle longitudinal direction.

Therefore, by using the auxiliary battery 32, 33 disposed with the propulsion battery 31 in the rear room 3 as a buffer member, the propulsion battery 31 may be protected from the rear end collision impact.

(2) A room floor surface 30 representing a floor surface of the rear room 3 is configured to include a vehicle front side, first floor surface 30a and a second floor surface 30c provided with a lower ground surface clearance than the first floor surface 30a through a stepped wall surface 30b extending from the first floor surface 30a, and the propulsion battery 31 is mounted on the first floor surface 30a and the auxiliary battery 32, 33 is mounted on the second floor surface 30c. Thus, in addition to the effect of (1), at the time of collision, due to the stepped surface 30b, the auxiliary battery 32, 33 may be prevented from the vehicle forward movement toward the propulsion battery 31 so that the protective performance of the propulsion battery 31 from the rear end collision may be improved.

(3) In the upper or top vehicle space, the propulsion battery 31 and the electrical components to manage charging and discharging of the propulsion battery 31 and the auxiliary battery 32,33 (joint box 34, both DC/DC converter 35, 36, and charger 37) are disposed. Therefore, in addition to the effects of (1) or (2), the vehicle space above the propulsion battery 31 disposed in the rear room 3 may be effectively used for a layout space of electrical components (joint box 34, the two DC/DC converters 35, 36, charger 37) so that it is possible to achieve the compactness of rear room 3.

(4) The auxiliary battery includes a first auxiliary battery 32 that is intended for a power source of a starter motor 1 of the engine 4 and a second auxiliary battery 33 as a power source for auxiliary equipment other than that for starter motor 10, and the first auxiliary battery 32 and the second auxiliary battery 33 are arranged side by side in the vehicle width direction at the same vehicle longitudinal position which is rearward of and thus in the vehicle rear side space of the propulsion battery 31. Therefore, in addition to the effects of (1) to (3), by using the two auxiliary batteries 32, 33 which are disposed side by side in the vehicle width direction in the rear room 3 as a buffer member, the propulsion battery 31 may be protected even against an offset rear end collision impact.

The battery cooling structure for an electric vehicle according to the present invention has been described above with reference to the first embodiment. The specific configuration is not limited to the first embodiment. Rather, design modifications or additions may be allowed as long as they would not depart from the spirit of the present invention as recited in each claim in the Claims.

In the first embodiment, an example of the propulsion battery of the three-stage stacked structure is shown composed of lower, middle, and upper stage batteries. However, the propulsion battery may be of a single stage example or of two-stage stacked structure. Further, an example in which more than two-stage batteries are stacked may be equally applicable.

In the first embodiment, an example of the auxiliary battery is shown in which a first auxiliary battery 32 and a second auxiliary battery 33 are disposed. However, as the auxiliary battery, a single battery may be arranged. Further, an example in which more than two batteries are disposed may be equally applicable.

In the first embodiment, as the room floor surface 30 constituting the floor surface of the rear room, an example having a first floor surface 30a, a stepped wall surface 39b, and a second floor surface 30c has been shown. However, as the room floor surface representing the floor surface of the rear room, such an example is acceptable in which the mounting surface of the propulsion battery and the mounting surface of the auxiliary battery are formed with a floor surface with the same flat or planer surface.

In the first embodiment, an example is shown in which, in the vehicle upper space of the propulsion battery 31, the electrical components or parts to manage the charging and discharging of the propulsion battery 31 and the auxiliary battery 32, 33 are disposed. However, such an example may be conceived in which the electrical components are not disposed in the vehicle upper space of the propulsion battery 31.

In the first embodiment, an example is shown in which the battery system component layout structure according to the present invention is applied to an FF plug-in hybrid vehicle. However, the battery cooling structure for an electrically driven vehicle according to the present invention may be applicable to a hybrid vehicle that does not have a plug-in structure, further, to an electric vehicle that has only an electric motor as a drive source. In short, the present invention may be applied to an electrically driven vehicle that has the propulsion battery disposed in a battery room, which is cooled by the cooling air from the cooling fan.

The invention claimed is:

1. A vehicle battery system component layout structure comprising:
    a center room of a vehicle configured to seat a driver and a passenger;
    a rear room of the vehicle disposed rearward of the center room;
    a vehicle propulsion battery disposed in a vehicle front side space in the rear room; and
    an auxiliary battery disposed in a vehicle rear side space in the rear room rearward of the propulsion battery and in a position in which the auxiliary battery overlaps with the propulsion battery in a vehicle longitudinal direction as viewed from a rear end of the vehicle, the auxiliary battery including a first auxiliary battery and a second auxiliary battery,
    the first auxiliary battery only providing power to a starter motor of an engine, and
    the second auxiliary battery only providing power to auxiliary equipment other than the starter motor.

2. The vehicle battery system component layout structure as claimed in claim 1, wherein
    the rear room includes a room floor surface defining a floor surface of the rear room, the room floor surface includes a first floor surface on the vehicle front side space and a second floor surface provided with a ground surface clearance lower than the first floor surface through a stepped wall surface extending from the first floor surface, and the propulsion battery is mounted on the first floor surface and the auxiliary battery is mounted on the second floor surface.

3. The vehicle battery system component layout structure as claimed in claim 1, wherein
    the propulsion battery includes a vehicle upper space that is provided with an electrical component to manage charging and discharging of the propulsion battery and the auxiliary battery.

4. A vehicle battery system component layout structure comprising:
    a center room of a vehicle configured to seat a driver and a passenger;
    a rear room of the vehicle disposed rearward of the center room;
    a vehicle propulsion battery disposed in a vehicle front side space in the rear room; and
    an auxiliary battery disposed in a vehicle rear side space in the rear room rearward of the propulsion battery and in a position in which the auxiliary battery overlaps with the propulsion battery in a vehicle longitudinal direction as viewed from a rear end of the vehicle;
    wherein the auxiliary battery includes a first auxiliary battery for a power source of a starter motor of an engine and a second auxiliary battery for a power source for auxiliary equipment other than the starter motor, and the first auxiliary battery and the second auxiliary battery are arranged side by side in a vehicle width direction at the same vehicle longitudinal position in the vehicle rear side space of the propulsion battery.

5. The vehicle battery system component layout structure as claimed in claim 2, wherein
    the propulsion battery includes a vehicle upper space that is provided with an electrical component to manage charging and discharging of the propulsion battery and the auxiliary battery.

6. The vehicle battery system component layout structure as claimed in claim 5, wherein
    the first auxiliary battery and the second auxiliary battery are arranged side by side in a vehicle width direction at the same vehicle longitudinal position in the vehicle rear side space of the propulsion battery.

7. The vehicle battery system component layout structure as claimed in claim 2, wherein
    the first auxiliary battery and the second auxiliary battery are arranged side by side in a vehicle width direction at the same vehicle longitudinal position in the vehicle rear side space of the propulsion battery.

8. The vehicle battery system component layout structure as claimed in claim 3, wherein
the first auxiliary battery and the second auxiliary battery are arranged side by side in a vehicle width direction at the same vehicle longitudinal position in the vehicle rear side space of the propulsion battery.

\* \* \* \* \*